United States Patent
Armstrong et al.

(10) Patent No.: US 10,350,638 B2
(45) Date of Patent: Jul. 16, 2019

(54) RESONATING GAS SEISMIC SOURCE

(71) Applicants: PGS Geophysical AS, Oslo (NO);
Geospectrum Technologies Inc.,
Dartmouth (CA)

(72) Inventors: Bruce Armstrong, Dartmouth (CA);
Paul Yeatman, Dartmouth (CA);
Øystein Traetten, Asker (NO); Mattias Oscarsson, Oslo (NO); Rune Voldsbekk, Orammen (NO); Rune Tønnessen, Lummendalen (NO)

(73) Assignees: PGS Geophysical AS, Oslo (NO);
Geospectrum Technologies Inc.,
Dartmouth (CA)

( * ) Notice: Subject to any disclaimer, the term of this patent is extended or adjusted under 35 U.S.C. 154(b) by 485 days.

(21) Appl. No.: 15/300,111

(22) PCT Filed: Oct. 30, 2014

(86) PCT No.: PCT/EP2014/073327
§ 371 (c)(1),
(2) Date: Sep. 28, 2016

(87) PCT Pub. No.: WO2015/063211
PCT Pub. Date: May 7, 2015

(65) Prior Publication Data
US 2017/0216886 A1    Aug. 3, 2017

Related U.S. Application Data

(60) Provisional application No. 61/898,234, filed on Oct. 31, 2013, provisional application No. 61/898,245,
(Continued)

(51) Int. Cl.
*B06B 1/06* (2006.01)
*G10K 9/125* (2006.01)
(Continued)

(52) U.S. Cl.
CPC .............. *B06B 1/0611* (2013.01); *G01V 1/04* (2013.01); *G01V 1/135* (2013.01); *G01V 1/145* (2013.01);
(Continued)

(58) Field of Classification Search
CPC ...... B06B 1/0611; G10K 11/04; G10K 9/125; G10K 9/04; G01V 1/38; G01V 1/04; G01V 1/159; G01V 1/145; G01V 1/135
See application file for complete search history.

(56) References Cited

U.S. PATENT DOCUMENTS 3,978,940 A    9/1976  Bouyoucos
4,135,142 A    1/1979  Percy et al.
(Continued)

OTHER PUBLICATIONS

Examination Report dated Aug. 20, 2018 for Australian patent application 2014343764; 3 pages.
(Continued)

*Primary Examiner* — Daniel Pihulic

(57) ABSTRACT

An apparatus includes a marine seismic source having a volume of gas and a gas reservoir, and the marine seismic source and the gas reservoir are coupled to permit a resonating gas flow to pass therebetween. The apparatus may be a component of a marine seismic survey system. The apparatus may be utilized in a method of marine seismic surveying.

18 Claims, 14 Drawing Sheets

Related U.S. Application Data filed on Oct. 31, 2013, provisional application No. 61/898,246, filed on Oct. 31, 2013.

(51) Int. Cl.

| | |
|---|---|
| *G10K 9/04* | (2006.01) |
| *G01V 1/02* | (2006.01) |
| *G01V 1/135* | (2006.01) |
| *G01V 1/145* | (2006.01) |
| *G01V 1/04* | (2006.01) |
| *G01V 1/38* | (2006.01) |
| *G10K 11/04* | (2006.01) |

(52) U.S. Cl.
CPC .............. *G01V 1/159* (2013.01); *G01V 1/38* (2013.01); *G10K 9/04* (2013.01); *G10K 9/125* (2013.01); *G10K 11/04* (2013.01)

(56) References Cited

U.S. PATENT DOCUMENTS

| | | |
|---|---|---|
| 4,142,171 A | 2/1979 | Pickens |
| 5,233,570 A | 8/1993 | Donskoy |
| 5,894,451 A | 4/1999 | Dejaco |
| 6,002,648 A | 12/1999 | Ambs |
| 2003/0160546 A1 | 8/2003 | Osborn |
| 2009/0268554 A1 | 8/2009 | Armstrong |
| 2012/0051188 A1 | 3/2012 | Graber |
| 2017/0184742 A1* | 6/2017 | Armstrong ............ B06B 1/0611 |
| 2017/0216886 A1* | 8/2017 | Armstrong ............ B06B 1/0611 |
| 2018/0275304 A1* | 9/2018 | Armstrong ............ G01V 1/133 |

OTHER PUBLICATIONS

International Search Report for PCT Application No. PCT/EP2014/073327, dated Apr. 9, 2015.

Woollett, Ralph S.; "Underwater Helmholtz-Resonator Transducers: General Design Principles", NUSC Technical Report, Jul. 5, 1977.

International Search Report for PCT Application No. PCT/EP2014/073325, dated Apr. 9, 2015.

International Search Report for PCT Application No. PCT/EP2014/073326, dated Apr. 29, 2015.

* cited by examiner

RESONATING GAS SEISMIC SOURCE

CROSS-REFERENCE TO RELATED APPLICATIONS

This application is a US national phase entry of PCT/EP2014/073327 filed Oct. 30, 2014. The PCT/EP2014/073327 application claims the benefit of Provisional Patent Application No. 61/898,234 filed Oct. 31, 2013, Provisional Patent Application No. 61/898,245 filed Oct. 31, 2013, and Provisional Patent Application No. 61/898,246 filed Oct. 31, 2013. All these applications are hereby incorporated by reference in their entireties.

BACKGROUND

In the oil and gas exploration industry, various techniques of marine geophysical surveying are commonly used in the search for subterranean formations. Marine geophysical surveying techniques yield knowledge of the subsurface structure of the Earth, which is useful for finding and extracting hydrocarbon deposits such as oil and natural gas. Seismic surveying and electromagnetic surveying are two of the well-known techniques of marine geophysical surveying. Seismic surveying and electromagnetic surveying may be used separately or jointly in a survey operation.

During a typical marine seismic survey, a marine seismic source may be towed behind a survey vessel at a particular water depth. The marine seismic source may emit acoustic energy waves in a generally downward direction. The downward traveling acoustic waves may travel through a body of water and be reflected by the underlying Earth formations. The reflected acoustic waves may be detected by sensors such as hydrophones. Information regarding the Earth formations may be derived accordingly.

Generally speaking, when acoustic waves travel through water and Earth formations, higher frequency acoustic waves are attenuated more rapidly than lower frequency waves. Acoustic waves at lower frequencies (for example, infrasound) can be transmitted over longer distances through water and Earth formations than higher frequency acoustic waves. A marine seismic source that produces acoustic energy at lower frequencies may have utility in marine seismic surveys, particularly those conducted in increased water depths.

The design parameters for a marine seismic source may include, among others, acoustic energy output within a low frequency range (e.g., below about 10 Hz), water depth, weight, size and cost. As modern marine seismic surveys continue to explore waters at increased depths, there is a continuing need for a low cost (both in terms of manufacturing cost and operating cost) marine seismic source that produces high acoustic energy at lower frequencies, particularly at a frequency of below about 10 Hz.

DETAILED DESCRIPTION

Figure 1:
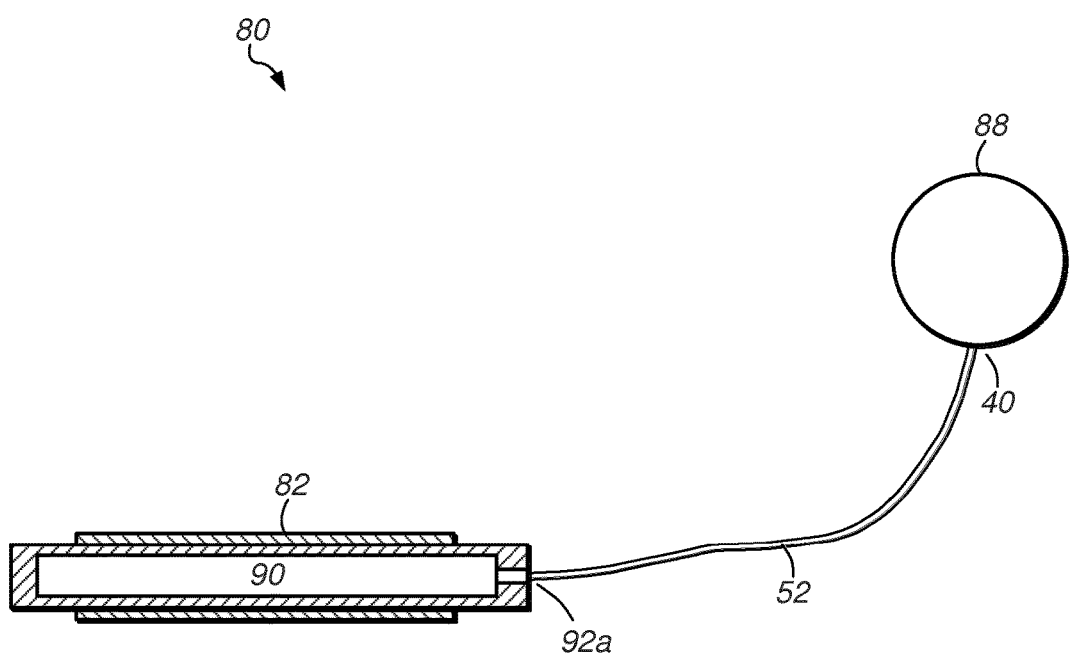
FIG. 1 illustrates an embodiment of an apparatus according to the disclosure herein.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

In a marine seismic survey, which is generally a seismic survey conducted in a marine environment (which may include saltwater, freshwater, and/or brackish water environments), one or more marine seismic sources may be utilized to generate acoustic energy. The acoustic energy may travel downward through the water and through the Earth formations underlying the water bottom. The acoustic impedance boundaries in the Earth formations may reflect, at least in part, the seismic waves that travel through the formations. The reflected seismic wave may in turn travel upwards. Seismic sensors (e.g., hydrophones or geophones) may capture such reflected seismic waves. These seismic sensors may convert the captured seismic waves into signals such as optical or electrical signals. The electrical or optical signals may then be interpreted to provide information both as to the composition and the structure of the various subsurface Earth formations under the water bottom. Such information may be used, for example, to determine the possibility that such Earth formations may contain mineral deposits including hydrocarbons.

One type of marine seismic source often used in marine geophysical surveying operations includes an impulsive type source such as an air gun, or an array of air guns. The frequency content of such sources is generally controllable only to a small degree, principally by altering the charge chamber sizes in an air gun array. The impulsive type marine seismic sources generally produce a limited acoustic energy output in a frequency range of about 1-10 Hz. Particularly over a frequency range of about 1 Hz to about 5 Hz, the acoustic energy output of the impulsive type sources is generally considered limited.

Another type of marine seismic source may include an acoustic vibratory source. Such a source may include certain pneumatic or hydraulic components. A typical acoustic vibratory source may employ piezoelectric or magnetostrictive material. Acoustic vibratory sources are generally known for better frequency control than the impulsive type of sources. The acoustic vibratory sources may produce a limited acoustic energy output at a frequency range of about 1-100 Hz. Both types of marine seismic sources may be employed in a marine seismic survey.

In an acoustic vibratory source that includes a piezoelectric component, mechanical vibration of the acoustic vibratory source may be created by applying a voltage to the piezoelectric component. The electric field created may cause the piezoelectric material to deform in proportion to the voltage, and the deformation may be used to create vibrations in the vibratory source. The inverse may also occur. A force, such as that created by an acoustic wave, may create a deformation in the piezoelectric material, and this deformation may in turn create an electric field. When used in this fashion, the device is frequently called a hydrophone.

FIG. 1 illustrates a non-limiting embodiment of apparatus 80. Apparatus 80 may include marine seismic source 82. Marine seismic source 82 may include various types of acoustic vibratory sources, sound projectors, and other such devices.

Figure 2A:
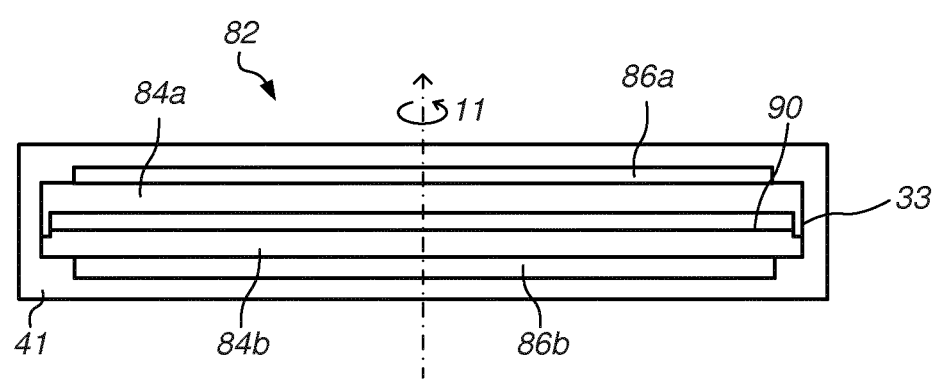
FIG. 2A illustrates a cross-sectional view of a marine seismic source according to an embodiment of the disclosure herein.

A cross-sectional view of a non-limiting embodiment of marine seismic source 82 is illustrated in FIG. 2A. As shown, marine seismic source 82 may be in the form of an electromechanical device such as a "bender" (may also be called a "flexural-disc projector"). In some embodiments, marine seismic source 82 may include flexible waterproof material 41 (e.g., plastic or rubber). In other embodiments, however, flexible waterproof material 41 may be omitted from marine seismic source 82. However, the disclosure is not limited to marine seismic source 82 being an electromechanical device or a bender. Marine seismic source 82 may include other types of acoustic vibratory sources, sound projectors, and other such devices.

In this particular embodiment, marine seismic source 82 may include components such as a pair of discs 84a and 84b. Discs 84a and 84b may each be of a circular shape, an elliptic shape, or another shape. Discs 84a and 84b may be made from a material with electrical conductivity properties, such as metal (e.g., aluminum, steel, etc.). Discs 84a and 84b may be made from a same material in one embodiment. Yet in another embodiment, discs 84a and 84b may be made from different materials that exhibit electrical conductivity properties.

Marine seismic source 82 may also include components such as a pair of piezoelectric components 86a and 86b. Piezoelectric components 86a and 86b may be made from a ceramic material or other materials exhibiting piezoelectricity. Piezoelectric components 86a and 86b may each be in a circular shape, an elliptic shape, or another shape, either contiguous or non-contiguous. Piezoelectric components 86a and 86b may be made from a same piezoelectric material or different piezoelectric materials. In this embodiment illustrated in FIG. 2A, areas of piezoelectric components 86a and 86b may be smaller than areas of discs 84a and 84b. A total mass of marine seismic source 82 would include a mass of discs 84a and 84b and a mass of piezoelectric components 86a and 86b.

Piezoelectric component 86a may be attached to disc 84a, and piezoelectric component 86b may be attached to disc 84b. In one particular embodiment, piezoelectric component 86a may be attached to disc 84a by an adhesive such as epoxy or other similar components. However, there is no limitation as to how piezoelectric components 86a and 86b may be attached to discs 84a and 84b, respectively. As used herein, the words "attach," or "attached" and other derivations thereof mean a connection between components, whether direct or indirect.

Figure 2B:
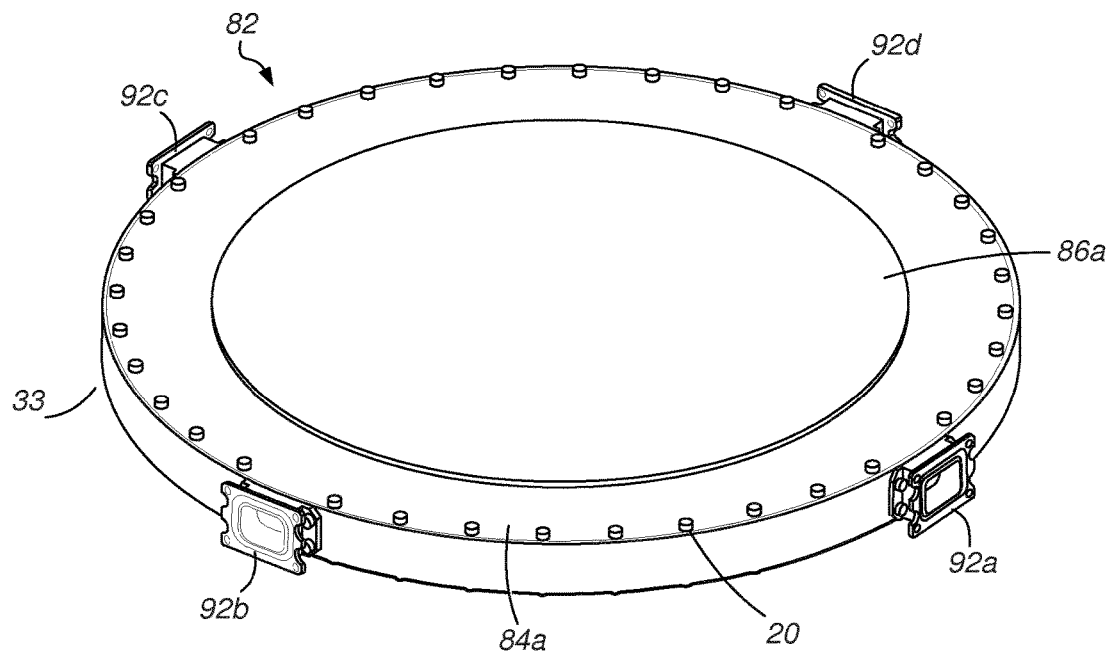
FIG. 2B illustrates a top view of a marine seismic source according to an embodiment of the disclosure herein.

A pair of discs 84a and 84b (having, for example, attached piezoelectric components 86a and 86b) may be held together to form cavity 90 between the discs. Cavity 90 is included in marine seismic source 82. In one non-limiting embodiment, discs 84a and 84b may be secured together by hoop 33 illustrated in FIG. 2A. In that embodiment, hoop 33 may be secured to discs 84a and 84b by one or more bolts 20 illustrated in FIGS. 2B and 2C. Cavity 90 may be bounded by the pair of discs 84a and 84b and held in place by hoop 33 that is included in marine seismic source 82. Hoop 33 may be configured to maintain a separation (e.g., a gap) between the pair of discs 84a and 84b (having, for example, the pair of piezoelectric components 86a and 86b) and facilitate a movement of marine seismic source 82. For example, when electric energy is applied to piezoelectric components 86a and 86b, discs 84a and 84b may move or push against hoop 33.

Figure 2C:
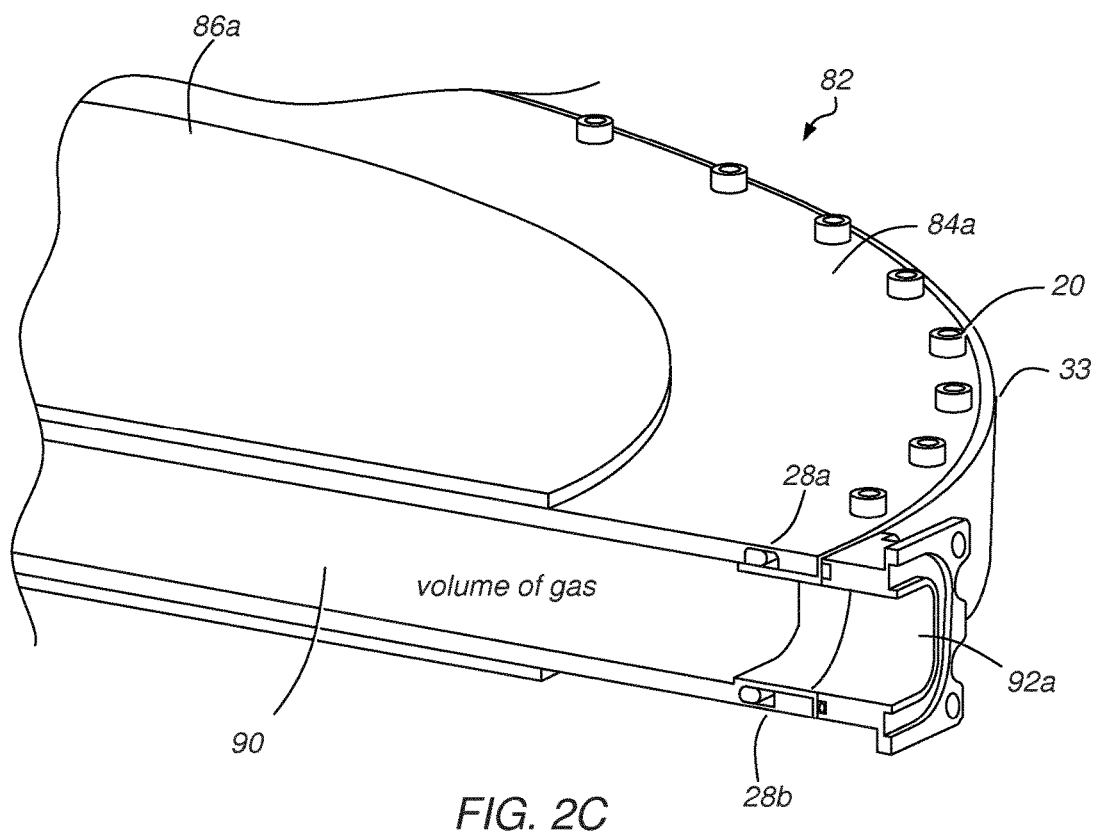
FIG. 2C illustrates a cut-away view of a marine seismic source according to an embodiment of the disclosure herein.

Discs 84a and 84b may be bounded at their respective perimeters. A close-up view in FIG. 2C illustrates that marine seismic source 82 may include o-rings 28a and 28b each configured to provide a respective connection (e.g., a seal) between hoop 33 and the discs. And the respective perimeters of discs 84a and 84b may be secured to hoop 33 by one or more bolts 20 and accordingly form cavity 90. Hoop 33 may include at least one port around its perimeter. In the embodiment illustrated in FIG. 2B and FIG. 2D, hoop 33 includes ports 92a, 92b, 92c, and 92d. Each of such ports may be configured to facilitate the resonating gas flow to pass between cavity 90 and gas reservoir 88 (for example, as illustrated in FIG. 1).

Figure 2D:
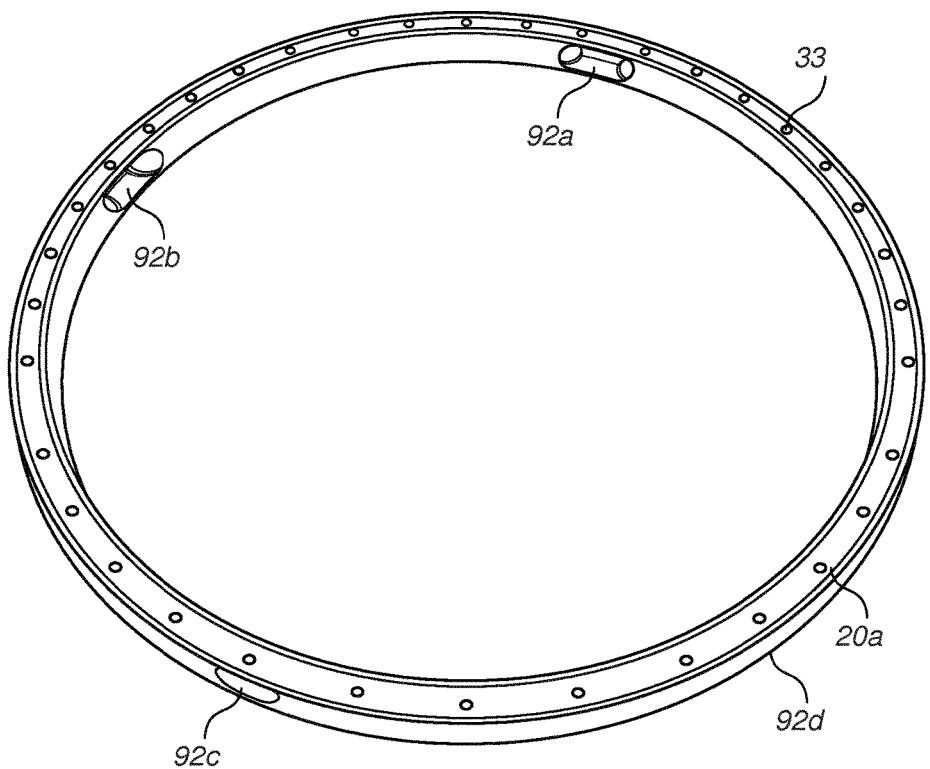
FIG. 2D illustrates a component of an apparatus according to an embodiment of the disclosure herein.
Figure 2E:
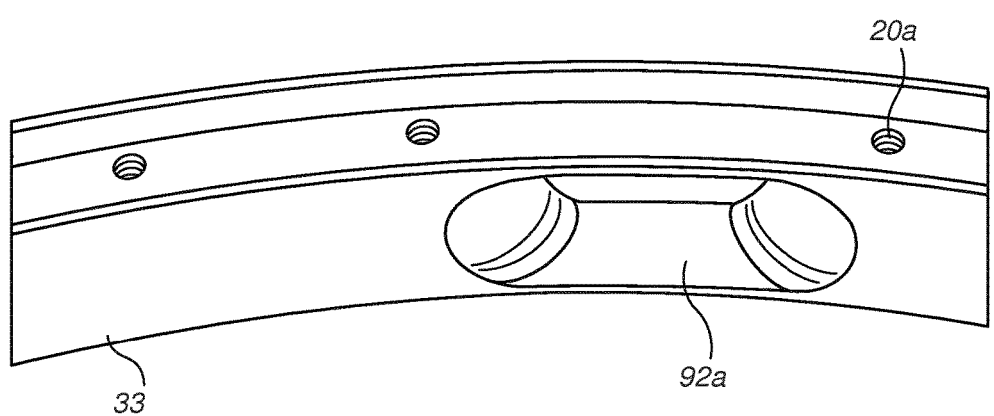
FIG. 2E illustrates a close-up view of the illustration in FIG. 2D.

As illustrated in FIG. 2D, hoop 33 may include one or more sockets 20a that are configured to receive corresponding one or more bolts 20 in order to secure discs 84a and 84b to hoop 33. FIG. 2E illustrates a close-up and partial view of hoop 33. In FIG. 2E, hoop 33 may include port 92a and socket 20a.

Cavity 90 may be configured to contain a volume of gas such as air or any other compressible fluid or gaseous substances. Although compressible fluids may be employed, the contents of cavity 90 are referred to here as a "gas" for simplicity. The volume of gas within cavity 90 may be dependent on the volume of cavity 90, which in turn would depend on dimensions of cavity 90 (e.g., diameter, length, height, etc.). A skilled artisan may refer to the volume of gas contained or restricted within cavity 90 as "trapped" gas (in the case that cavity 90 contains a volume of air, it may be referred to as "trapped air," for example) when the volume of gas is not communicative with objects (e.g., another volume of gas) external to cavity 90. The volume of gas contained within cavity 90 may serve, among other purposes, as a compliant medium to reduce any impedance to the vibration amplitude of discs 84a and 84b.

In some embodiments, the volume of gas within cavity 90 may be pressurized. In marine applications, pressurizing and maintaining the volume of gas within cavity 90 at an ambient hydrostatic pressure at an operating water depth may protect marine seismic source 82 from collapsing from the ambient hydrostatic pressure.

In the embodiment illustrated by FIG. 2A, when electric energy (e.g., a sinusoidal voltage) is applied to piezoelectric components 86a and 86b, discs 84a and 84b may bend, flex or otherwise be distorted in proportion to the electric energy (e.g., the sinusoidal voltage), resulting in vibration and acoustic output. In this embodiment, discs 84a and 84b may bend, flex, or otherwise be distorted axially along axis of symmetry 11.

The vibration of discs 84a and 84b may also cause a dynamic pressure variation in the volume of gas within cavity 90. The dynamic pressure may be greater when the volume of gas within cavity 90 is trapped or restricted (e.g., not communicative with other objects external to cavity 90). The dynamic pressure may oppose the vibration of discs 84a and 84b and the acoustic energy output of marine seismic source 82 may be reduced.

Returning now to FIG. 1, apparatus 80 may include gas reservoir 88. In the non-limiting embodiment illustrated in FIG. 1, gas reservoir 88 may be disposed external to marine seismic source 82. Gas reservoir 88 may include a cavity or container which may be made from a material such as, without limitation, metal, alloy or polymer. Gas reservoir 88 may be configured to contain a volume of gas such as air or other gaseous substances. The volume of gas contained in gas reservoir 88 may be of a same or different value of the volume of gas within cavity 90. The volume of gas would depend on a volume of gas reservoir 88, which in turn would be based on dimensions of gas reservoir 88 (e.g., diameter, length, height, etc.).

In the non-limiting embodiment illustrated in FIG. 1, gas reservoir 88 may include aperture 40. Yet in other embodiments, gas reservoir 88 may include more than one aperture (not shown in FIG. 1). Aperture 40 may or may not include a valve or other device that may regulate, direct or control the flow of gas to and from gas reservoir 88. In the embodiments in which gas reservoir 88 may include more than one aperture, any number of valves may be included, or valves may be omitted entirely.

Gas reservoir 88 and marine seismic source 82 may be coupled. In the non-limiting embodiment illustrated in FIG. 1, gas reservoir 88 and cavity 90 of marine seismic source 82 may be coupled to permit a resonating gas flow to pass therebetween. As a result of such coupling, the volume of gas within gas reservoir 88 may be in fluid communication with the volume of gas within cavity 90. A total volume of gas within apparatus 80 may include the volume of gas within cavity 90 and the volume of gas within gas reservoir 88.

In the embodiment illustrated in FIG. 1, marine seismic source 82 (by way of cavity 90) and gas reservoir 88 may be coupled via conduit 52. One end of conduit 52 may be coupled to cavity 90. For example, one end of conduit 52 may be coupled to port 92a of cavity 90 illustrated in FIG. 1. The other end of conduit 52 may be coupled to gas reservoir 88. In one non-limiting embodiment, ports 92a, 92b, 92c, and 92d illustrated in FIG. 2B and FIG. 2D may be connected to one another which may then be connected to gas reservoir 88.

Conduit 52 may be a hose, a pipe or other suitable apparatus. In some embodiments, conduit 52 may have a generally circular cross-sectional area that may be defined by a diameter, while in other embodiments conduit 52 may have a cross-sectional area defined by any other suitable geometry. A volume of conduit 52 would depend on dimensions of conduit 52 (e.g., cross-sectional area, length, etc.). More than one conduit 52 may be included in apparatus 80. For example, a plurality of conduits 52 may be arranged in an array. Marine seismic source 82 and gas reservoir 88 may be coupled via the plurality of conduits. For example, FIG. 4E (to be discussed in further detail in other portions of the specification) shows an embodiment in which an array of four conduits 54a, 54b, 54c, and 54d joining into conduit 52. A total volume of several conduits 52 would be based on the dimensions and number of conduits 52. The number of conduits 52 and other components shown in the figures is only for purposes of illustration and is not a limitation on the number of components that may be used in any particular embodiment. Moreover, other shapes, configurations, and geometries of conduit 52 are specifically contemplated and included here.

A total volume of gas within apparatus 80 may be a sum of the volume of gas within conduit 52 and the respective portions of gas within gas reservoir 88 and cavity 90. In other words, the total volume of gas within apparatus 80 may include three portions: a first portion within gas reservoir 88, a second portion within cavity 90, and a third portion within conduit 52.

As discussed earlier, apparatus 80 may include, either as one form of marine seismic source 82 or a component included in marine seismic source 82, an electromechanical device that is configured to resonate the volume of gas within apparatus 80 in response to an input of electric energy (e.g., applying a voltage to the electromechanical device or the electromechanical device receiving a voltage). That is, the volume of gas may be resonated within apparatus 80 by the energy imparted to the volume of gas based on the vibration of the electromechanical device. In one non-limiting embodiment, because cavity 90 and gas reservoir 88 may be coupled to permit a resonating gas flow to pass therebetween, when marine seismic source 82 actuates, a resonating gas flow may pass between cavity 90 and gas reservoir 88. In the embodiment in which cavity 90 and gas reservoir 88 are coupled via conduit 52, a resonating gas flow may accordingly pass between cavity 90 and gas reservoir 88 by way of conduit 52. In this and other embodiments, a resonance frequency (or resonance) of the volume of gas within apparatus 80 may be dependent on factors including dimensions (e.g., diameter and/or length) of conduit 52.

Specifically, when marine seismic source 82 includes an electromechanical device, the electromechanical device may include one or more piezoelectric components. The electromechanical device may include, for example, two piezoelectric components such as 86a and 86b illustrated in FIG. 2A. Upon piezoelectric components 86a and 86b receiving electric energy, the electromechanical device may vibrate. Marine seismic source 82 may operate (e.g., be driven) at a frequency of the electric energy. The vibration may cause the volume of gas within cavity 90 to flow in and out between cavity 90 and gas reservoir 88. When piezoelectric components 86a and 86b operate (e.g., are driven) at the resonance frequency of the volume of gas flowing between cavity 90 and gas reservoir 88, the dynamic pressure within cavity 90 may peak. The resonance frequency of the volume of gas resonating between cavity 90 and gas reservoir 88 may be determined based on dimensions such as a length and a cross-sectional area of conduit 52. The resonance frequency of the volume of gas resonating between cavity 90 and gas reservoir 88 may also be affected by other parameters. Such other parameters may include a volume of cavity 90, a volume of gas reservoir 88, a length, cross-sectional area and/or quantity of other components in the flow path of the volume of gas (e.g. port 92a), and ambient pressure. A suitable choice of these aforementioned parameters may cause marine seismic source 82 to generate acoustic energy at a particular frequency range (e.g., below 10 Hz). The particular frequency range would in turn determine a range of corresponding advantageous water depth for operating marine seismic source 82. For example, when marine seismic source 82 is operating at a frequency of 5 Hz, the wavelength of an acoustic wave may be approximately 300 meters (e.g., based on a sound velocity in water of approximately 1,500 m/s) and the advantageous operating depth may therefore be approximately wavelength/4 or approximately 75 meters.

Figure 3A:
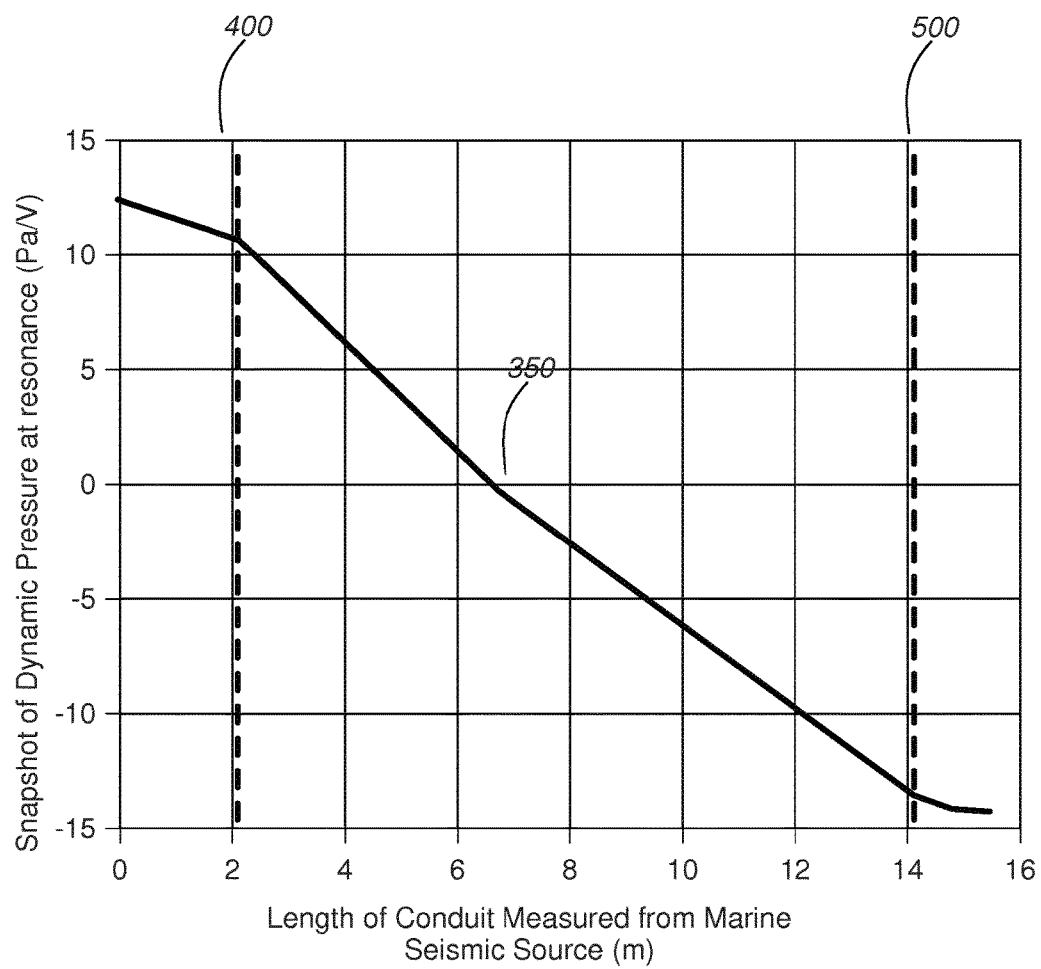
FIG. 3A illustrates a plot based on computer simulation data correlating dynamic pressure and a distance of conduit from a marine seismic source according to an embodiment of the disclosure herein.

The graph illustrated in FIG. 3A shows operating parameters for a particular non-limiting embodiment of apparatus 80 based on computer simulation data. FIG. 3A illustrates curve 350 which indicates a dynamic pressure in conduit 52 (y-axis) as a function of a length of conduit 52 (x-axis) when apparatus 80 is operating at a resonance frequency of 3 Hz at an instant in time in which the magnitude of the pressure is maximum. The dynamic pressure may vary sinusoidally with time. Curve 350 may be interpreted to show that a total length of conduit 52 starts at x=0 and ends at just over 14 meters. Lines 400 and 500 demarcate respective ends of conduit 52 (e.g., an end that is configured to couple to marine seismic source 82 indicated by line 400 and another end that is configured to couple to gas reservoir 88 indicated by line 500). Curve 350 may be interpreted to show that the dynamic pressure within apparatus 80 passes through zero within the total length of conduit 52. The varying particular dynamic pressure may be interpreted to indicate that marine seismic source 82 is under pressure when gas reservoir 88 is under a partial vacuum. In other words, FIG. 3A indicates that the volume of resonating gas may "slosh" back and forth between marine seismic source 82 and gas reservoir 88.

Because a resonance of the volume of resonating gas within apparatus 80 may be approximated as proportional to $$\sqrt{\frac{\text{cross-sectional area of conduit 52}}{\text{length of conduit 52}}},$$

given a particular change in a ratio of a cross-sectional area and/or a length of conduit 52, a corresponding change in the resonance of the volume of gas within conduit 52 may be approximated or determined.

When coupled via conduit 52, cavity 90 and gas reservoir 88 may be pressurized to reach a certain pressure. In some embodiments, cavity 90 may include a volume of gas at a pressure greater than a static pressure at the particular water depth. In other embodiments, however, cavity 90 may include a volume of gas at a pressure less than a static pressure at the particular water depth. In other embodiments, an amount of overpressure or underpressure within cavity 90 and/or gas reservoir 88, when compared to an ambient static or hydrostatic pressure, may be constrained regardless of the particular water depth, for example, up to +−0.3 bar. Certain embodiments of marine seismic source 82 that include piezoelectric components may be less tolerant of tension than of compression. For one of these embodiments, a pressure within cavity 90 and gas reservoir 88 may be near a hydrostatic ambient pressure so that the pressure is no more than about 0.2 bar less than the ambient pressure.

A sound projector such as marine seismic source 82 may generate acoustic energy at a particular frequency range (e.g., a low frequency range between about 1 Hz and 10 Hz). Such a sound projector (e.g., marine seismic source 82) may achieve a particular ratio of power output to sound projector size at a particular mechanical resonance frequency. While a resonance frequency of the volume of gas may be approximated or determined based on dimensions of conduit 52 as discussed in more detail above with regard to FIG. 3A, a mechanical resonance frequency of marine seismic source 82 may be specific to a stiffness and a mass (e.g., vibrating mass) of marine seismic source 82.

In general, when diameters of discs 84a and 84b increase and thicknesses of discs 84a and 84b decrease, the mechanical resonance frequency of marine seismic source 82 may decrease. This is largely due to a decrease of an overall stiffness of discs 84a and 84b, which may also be expressed as an increase in the mechanical compliance of discs 84a and 84b. (Generally speaking, those skilled in the art may also refer to increasing mechanical compliance as "softness," as opposed to "stiffness.") The more mechanically compliant marine seismic source 82 is, the lower its mechanical resonance frequency may be.

On the other hand, when diameters of discs 84a and 84b increase and the mechanical resonance frequency decreases, a stiffness of the volume of gas within cavity 90 may increase relative to the overall stiffness of discs 84 and 84b. An increase in stiffness of the volume of gas within cavity 90 may result in a decrease in the acoustic energy output of marine seismic source 82. In other words, when the stiffness of the volume of gas within cavity 90 increases, it may inhibit the vibration amplitude of discs 84a and 84b and may cause a decrease in the acoustic energy output of marine seismic source 82. Moreover, the stiffness of the volume of gas within cavity 90 may also increase as the internal pressure increases.

Unless a sound projector (e.g., marine seismic source 82) is pressure compensated (e.g., keeping internal pressure including the pressure of the volume of gas within cavity 90 at or near an ambient static or hydrostatic pressure), the sound projector having subsonic resonance frequencies may have survival depths of only a few meters below a water surface. Therefore, as the operating depth increases, the internal pressure within the sound projector (e.g., marine seismic source 82) may increase, with a concomitant increase in stiffness and loss of acoustic energy output.

A maximum sound pressure level of a sound projector (e.g., marine seismic source 82) generally occurs at or near a mechanical resonance of the sound projector. Broadly speaking, sound pressure is a difference, in a given medium, between an average local pressure and a pressure in an acoustic wave. A square of this difference may be averaged over time and/or space, and a square root of this average provides a root-mean-square (RMS) pressure value or $P_{rms}$. Sound pressure level is a logarithmic measure indicating a ratio of a given $P_{rms}$ relative to a reference sound pressure or $P_{ref}$. Sound pressure level is typically measured in decibels (dB). In marine applications, a reference pressure $P_{ref}$ is usually 1 micropascal (1 µPa). In mathematical terms, sound pressure level may be calculated by the equation below:

Sound Pressure Level (dB)=20 log($P_{rms}/P_{ref}$)

A transmitting voltage response or TVR of a sound projector (e.g., marine seismic source 82) may be defined as a sound pressure level generated at a range of 1 meter by the sound projector (e.g., marine seismic source 82) for a 1 volt drive of input electric energy. TVR may be measured in a unit of decibels (dB) relative to a reference pressure of 1 micropascal for a 1 volt drive at 1 meter range.

In the embodiment illustrated in FIG. 1, a sound pressure level and/or a TVR level of marine seismic source 82 may depend at least in part on a resonance frequency of a resonating gas flow within apparatus 80. More specifically, when apparatus 80 operates based on the resonance frequency of the resonating gas flow and marine seismic source 82 vibrates, discs 84a and 84b may flex inwardly and outwardly along axis of symmetry 11 (upon receiving electric energy, for example). When discs 84a and 84b flex inwardly (e.g., toward one another along axis of symmetry 11), the volume of gas within cavity 90 may be exiting cavity 90 at such a speed that a partial vacuum may exist within cavity 90. When there is a partial vacuum (relative to an average or overall pressure within apparatus 80) within cavity 90, the acoustic energy output and vibration amplitude (e.g., displacement) of discs 84 and 84b may increase.

When marine seismic source 82 vibrates, discs 84a and 84b may also flex outwardly (e.g., away from one another along axis of symmetry 11) and the volume of gas entering into cavity 90 from gas reservoir 88 may cause the pressure within cavity 90 to increase above its ambient pressure (e.g., ambient static pressure, ambient hydrostatic pressure, etc.). The acoustic energy output of discs 84a and 84b may increase as a result.

When a resonant system is operating at the resonance of the resonating gas flow, the system such as an embodiment of apparatus 80 would operate so that the reactive forces of inertia and stiffness cancel, the vibration amplitude may be dependent of resistive elements (e.g., frictions in the system).

Figure 3B:
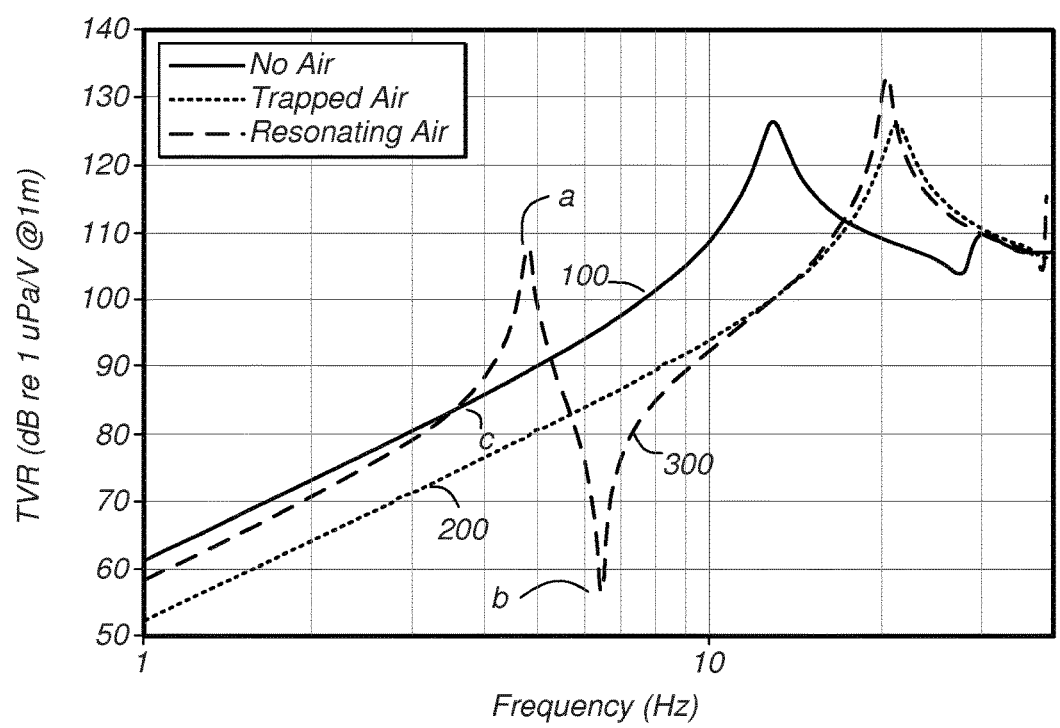
FIG. 3B illustrates a theoretical correlation between certain parameters for various configurations of a marine seismic source which includes a configuration according to an embodiment of the disclosure herein.

FIG. 3B may assist in understanding the operation of a resonant system. FIG. 3B illustrates theoretical operations of marine seismic source 82 under three configurations. The plot in FIG. 3B has an x-axis as a frequency at which marine seismic source 82 is operated and a y-axis as TVR for each configuration. A change in the TVR as a function of frequency for operating each configuration is accordingly shown as curve 100, curve 200, and curve 300 respectively.

Curve 300 illustrates the operation of marine seismic source 82 having a volume of gas (air in this case) within cavity 90 is coupled to gas reservoir 88 by way of conduit 52, between which a resonating gas flow (a resonating air flow) may pass (e.g., as described above with respect to one embodiment of apparatus 80). Based on an embodiment in which conduit 52 has a particular cross-sectional area and a particular length, the resonance of the resonating gas flow in this configuration may be at approximately 5 Hz.

FIG. 3B illustrates two other configurations of marine seismic source 82: a first in which cavity 90 is at a vacuum (e.g., illustrative of an operating state in which a volume of gas or air may have little or no effect on the TVR), and a second having a volume of gas (air in this case) that is trapped within cavity 90 (e.g., the volume of gas restricted within cavity 90 or not communicative with objects external to cavity 90).

Curve 100 corresponds to a configuration in which cavity 90 is at a vacuum (e.g., illustrative of an operating state in which a volume of gas or air may have little or no effect on the motion of discs 84a and 84b), or the "no-air" case. Curve 100 indicates, for example, a slope of the TVR is 12 dB/octave at frequencies well below resonance (e.g. 1 Hz), and increases as the frequency nears the mechanical resonance frequency of marine seismic source 82, which is indicated to be peaked at about 12 Hz in FIG. 3B. Marine seismic source 82 is generally stiffness controlled (e.g., the stiffness of the marine seismic source is a dominant factor during operation) up to its fundamental resonance whereas marine seismic source 82 is generally mass controlled (e.g., the mass of the marine seismic source is a dominant factor during operation) above the fundamental resonance. Thus near a particular frequency below the fundamental resonance, for example, at a frequency of 3 Hz, the vibratory amplitude of discs 84a and 84b, and hence the TVR, is controlled by the stiffness of marine seismic source 82 and of the volume of gas.

Curve 200 corresponds to a configuration in which a volume of gas (air) is trapped within cavity 90, or the "trapped air" case. Because the volume of gas is restricted within cavity 90 and cannot escape or communicate with objects external to cavity 90, the volume of gas may be compressed when discs 84a and 84b move axially inward. A concomitant increase in an internal pressure may therefore impede the motion of discs 84a and 84b. Such impedance may result in a decreased vibration amplitude of discs 84a and 84b, which may lead to a decreased acoustic radiation. In the "trapped air" case, a mechanical resonance frequency of marine seismic source 82 may be greater than that of the "no-air" case because the stiffness of discs 84a and 84b may be augmented by the stiffness of the trapped air. The fundamental resonance for this "trapped air" configuration is indicated at a peak of 20 Hz. Curve 200 indicates that the acoustic power output at 1 Hz is about 10 dB less than the acoustic power output indicated in curve 100, which is a factor of 10 in power (e.g., a change of 3 dB is a factor of 2 in power and 20 dB is a factor of 100). A loss in acoustic power output may increase when a volume of cavity 90 decreases. A loss in acoustic power output may also increase when an operating depth is increased. In other words, the stiffness of the volume of air within cavity 90 may be varied by varying either or both of these parameters.

Because marine seismic source 82 is generally stiffness controlled below its fundamental resonance (e.g., 12 or 20 Hz with respect to curves 100 or 200 indicated in FIG. 3B), its acoustic power output is strongly affected by the stiffness of the gas (e.g., air) within cavity 90. Just below the resonance of the volume of gas, the phase (measured against the drive voltage) of the partial vacuum created by the gas rushing out such that it enhances the vibration amplitude; whereas above the 5 Hz resonance, the phase of the partial vacuum is such that it impedes the vibration amplitude. Marine seismic source 82 remains generally stiffness controlled in these scenarios that correspond to curves 100 and 200. Because marine seismic source 82 is generally stiffness controlled below its fundamental resonance, the pressure of gas within cavity 90 may have such a dramatic impact on performance. Due to the phase of the gas flow velocity changing through the resonance of the gas, the dynamic gas pressure at first assists, and then detracts, from the vibration amplitude of discs 84a and 84b.

As noted earlier, FIG. 3B indicates that the resonance of the volume of gas (air in this case) is approximately at 5 Hz. Just below 5 Hz, the dynamic pressure of the gas enhances the vibration amplitude of discs 84a and 84b. At 6.5 Hz, however, the dynamic pressure of the gas has its maximum detrimental effect on the vibration amplitude.

Curve 300 corresponds to a configuration of marine seismic source 82 in which a resonating gas flow (air, in this case) may pass between cavity 90 and gas reservoir 88 (that is, marine seismic source 82 is in fluid communication with reservoir 88). When operating at a frequency below the resonance frequency of the resonating gas, the volume of gas may move in phase with discs 84a and 84b (e.g., 0 degree phase), and whether the volume of gas is contained within cavity 90 or within gas reservoir 88 may therefore have little or no effect on the movements of the discs. When operating below resonance in this configuration, an inward movement of discs 84a and 84b may not create a pressure as high as that indicated by curve 200. A decrease in TVR at low frequencies (e.g., 1 Hz) may therefore be less as indicated by curve 300.

On the other hand, when the frequency of curve 300 approaches the resonance of the resonating gas flow, the volume of gas may be energized by the movements of discs 84a and 84b. The closer the frequency is to the resonance of the resonating gas, the larger the volume of gas may be exiting cavity 90. When the system is operated at resonance, an amplitude of a movement of the volume of gas may be greatest. The gas movement is at a 90-degree phase relative to discs 84a and 84b.

In FIG. 3B, at the point where curve 300 intersects curve 100 as indicated by "c," the volume of gas may be exiting cavity 90 at a rate sufficient to keep the dynamic pressure at zero (e.g., the gas or air has no effect on the "no-air" TVR). At a greater frequency immediately above the frequency at intersecting point "c," the volume of gas may be exiting cavity 90 at a rate that creates a pressure that enhances the movements of discs 84a and 84b.

Relative to curves 100 and 200, curve 300 thus shows a lower local maximum frequency indicated by "a." The local maximum frequency may indicate operating states in which movements of discs 84a and 84b may be facilitated by the resonating gas flow. Curve 300 additionally suggests that, when operating above the resonance frequency of the volume of gas, the dynamic pressure imparted by the volume of gas may impede the motion of discs 84a and 84b. When discs 84a and 84b are flexing inwardly, the gas flow may enter cavity 90 from gas reservoir 88, thereby opposing the motion of discs 84a and 84b. This condition in which the gas flow most opposes the motion of discs 84a and 84b above the resonance frequency may be observed by the trough indicated as "b" in curve 300.

A resonance of marine seismic source 82 or the volume of gas (e.g., air) may create a 180 degree phase shift in whatever is resonating. When phase relative to the drive voltage to apparatus 80 is measured, it is the phase of the volume of gas that determines whether the pressure of the volume of gas may enhance or detract from the TVR. Accordingly, when apparatus 80 is operating above the resonance, movements of the volume of gas may be 180 degrees out of phase with the movement of discs 84a and 84b. FIG. 3B illustrates that the motion of discs 84a and 84b at a frequency near a peak of the TVR may be more than 40 dB greater than at a trough of the TVR.

FIG. 3B additionally indicates that curve 300 may at least partially overlap with curve 200 when operating above resonance. This happens in curve 300 because the volume of gas (air in this case) is generally mass controlled while marine seismic source 82 remains generally stiffness controlled. At these frequencies (and during a half cycle), an impedance imparted by conduit 52 may be so high that little or air may move within conduit 52, which is similar to the "trapped air" configuration indicated by curve 200.

In light of the foregoing, apparatus 80 may be operated or designed based on particular design or operating parameters. In some embodiments of apparatus 80, marine seismic source 82 may be configured to operate based on parameters including: a sound pressure level of 200 decibels (dB) relative to a reference level of 1 micropascal, and at a frequency ranging between 1 Hz and 10 Hz. In one particular embodiment, marine seismic source 82 may be configured to operate at a frequency of 3 Hz.

Figure 4A:
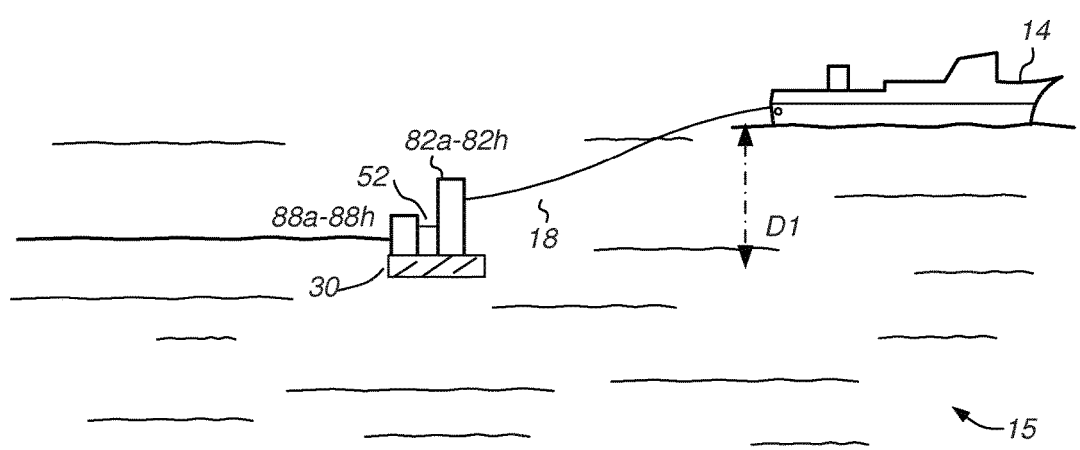
FIG. 4A illustrates an embodiment of a marine geophysical survey system that includes an apparatus according to the disclosure herein.
Figure 4B:
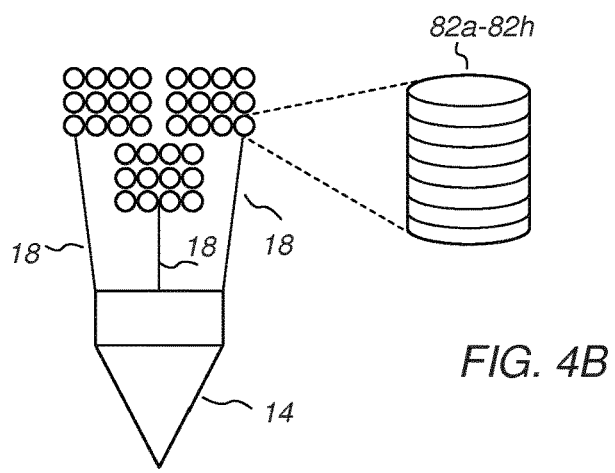
FIG. 4B illustrates an embodiment of a marine geophysical survey system that includes a particular arrangement of more than one of an apparatus according to the disclosure herein.
Figure 4C:
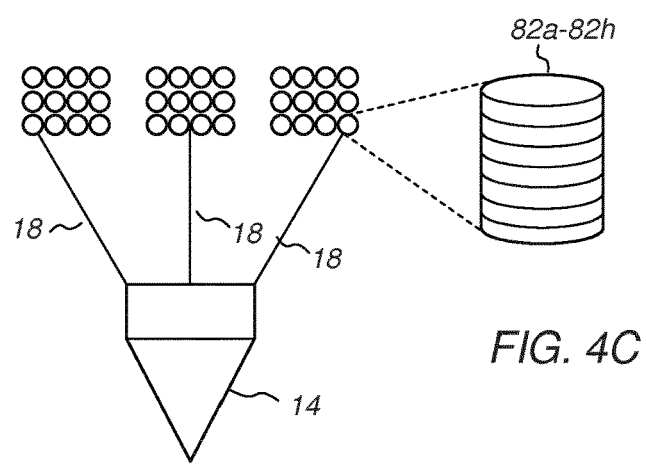
FIG. 4C illustrates an embodiment of a marine geophysical survey system that includes a parallel arrangement of more than one of an apparatus according to the disclosure herein.
Figure 4D:
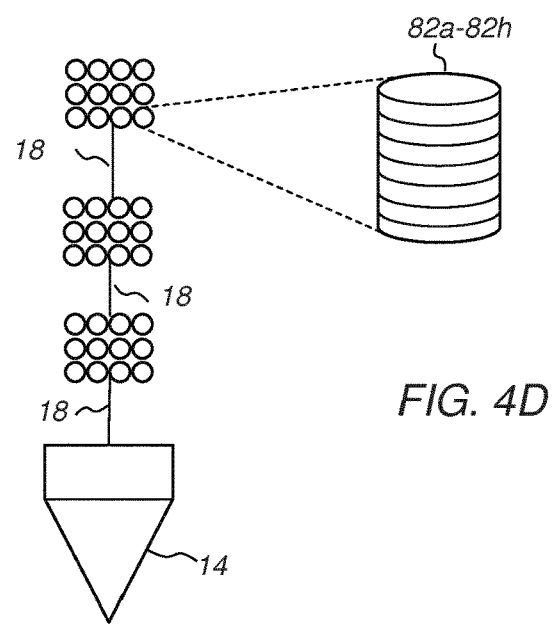
FIG. 4D illustrates an embodiment of a marine geophysical survey system that includes a series arrangement of more than one of an apparatus according to the disclosure herein.

FIG. 4A illustrates an embodiment of a marine seismic survey system used in acquiring geophysical data. Vessel 14 may move along a surface of body of water 15 such as a lake or the ocean. The marine seismic survey system illustrated in FIG. 4A may include one marine seismic source 82 or a plurality of marine seismic sources 82 towable behind vessel 14 below a surface of body of water 15. For example, the marine seismic survey system may include eight towable marine seismic sources 82a, 82b, 82c, 82d, 82e, 82f, 82g, and 82h illustrated in FIG. 5A, for example. Each of marine seismic sources 82a-82h may include a respective piezoelectric component. Marine seismic sources 82a-82h may be arranged in a stack configuration such as a stack assembly 94 in the embodiment discussed in detail in FIGS. 5A-7. Marine seismic sources 82a-82h may also be arranged in one or more arrays. Arrays of marine seismic sources 82a-82h may be arranged in a particular configuration illustrated in FIG. 4B. Arrays of marine seismic sources 82a-82h may be arranged in a parallel configuration illustrated in FIG. 4C. Arrays of marine seismic sources 82a-82h may be arranged in a series configuration illustrated in FIG. 4D. Each array and other arrays may be towed behind vessel 14 via cable 18. In some embodiments, additional vessels may be used to tow marine seismic sources or arrays thereof. Each of these array configurations and other configurations may be used (e.g., operated) separately or in any combination.

Vessel 14 may tow marine seismic sources 82a-82h by cable 18. Vessel 14 may also tow at least one gas reservoir 88. For example, vessel 14 may tow eight gas reservoirs 88a, 88b, 88c, 88d, 88e, 88f, 88g, and 88h. Gas reservoirs 88a-88h may each be configured to contain a volume of gas such as air or other gaseous substances. Gas reservoirs 88a-88h may be disposed external to marine seismic sources 82a-82h in body of water 15. Gas reservoirs 88a-88h and marine seismic sources 82a-82h may be disposed on or near support structure 30. Support structure 30 may be a platform, a cage, a semi-buoyant float, or other structure capable of maintaining marine seismic sources 82 and gas reservoirs 88 in a desired configuration. The arrangement, number of marine seismic sources 82, gas reservoirs 88 and other components shown in FIG. 4A is only for purposes of illustration and is not a limitation on the type of arrangements or number of components that may be used in any particular embodiment.

Marine seismic sources 82a-82h may each include respective cavities 90a, 90b, 90c, 90d, 90e, 90f, 90g, and 90h (not separately shown in FIG. 4A). Each of cavities 90a-90h may contain a respective volume of air or other gaseous substances. In one particular embodiment, each of cavities 90a-90h may be respectively coupled to each of gas reservoirs 88a-88h to permit fluid communication therebetween.

That is, cavity 90a (and cavities 90b-90h) may be coupled to gas reservoir 88a (and gas reservoirs 88b-88h, respectively) to permit fluid communication therebetween. In an alternative embodiment, some or all cavities 90a-90h may be coupled to at least one or all gas reservoirs 88a-88h by way of one or more conduits 52 to permit fluid communication therebetween. In yet another embodiment, each of cavities 90a-90h may be coupled to each of gas reservoirs 88a-88h by way of one or more conduit 52.

As discussed earlier, FIG. 4A illustrates an embodiment in which marine seismic source 82, specifically, a plurality of marine seismic sources 82a-82h that may be towed via cable 18 behind vessel 14 and/or disposed in body of water 15 at depth $D_1$. Marine seismic source 82a-82h may include at least one gas reservoir 88 (e.g., gas reservoirs 88a-88h as illustrated) external to marine seismic sources 82a-82h. The volume of gas within each of cavities 90a-90h may be pressurized to be near $P_1$, which may be greater than a static pressure at water depth $D_1$. The volume of gas within gas reservoir 88 may also be pressurized to be at or near $P_1$. Support structure 30 may support plurality of marine seismic sources 82a-82h, conduit 52, and external gas reservoirs 88a-88h.

Figure 4E:
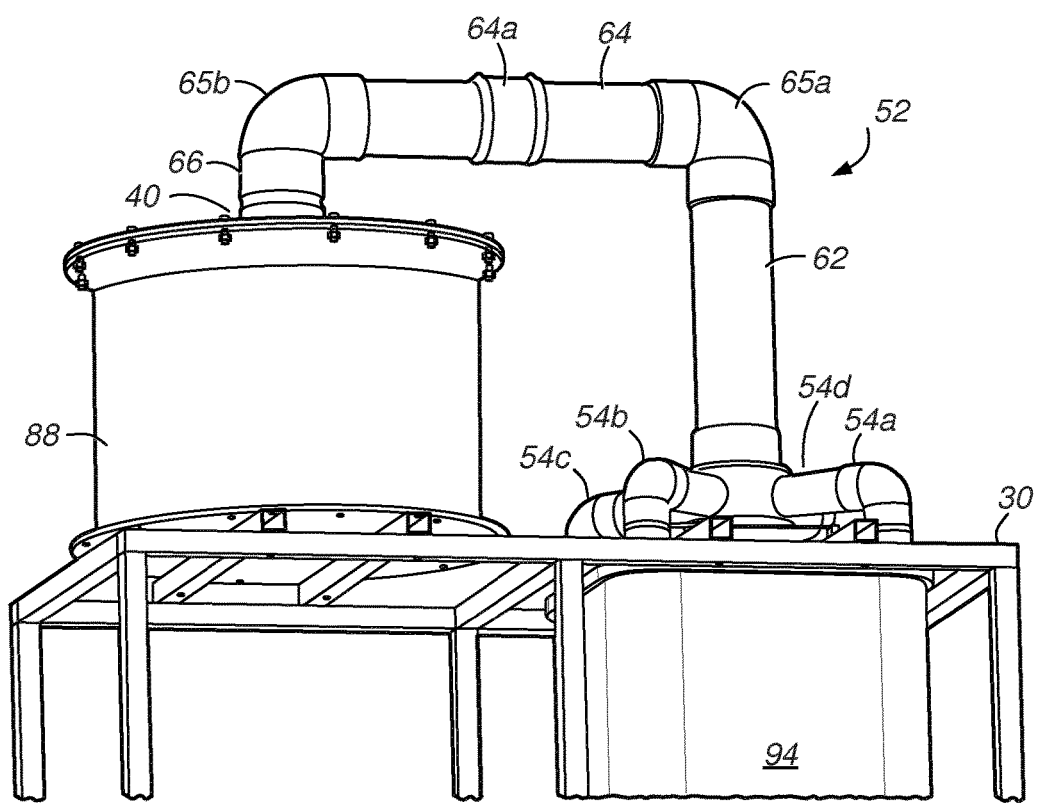
FIG. 4E illustrates an embodiment of an apparatus according to the disclosure herein.

FIG. 4E illustrates the arrangement of certain elements of FIG. 4A in greater detail, according to a particular embodiment. Specifically, FIG. 4E illustrates stack assembly 94 connected to gas reservoir 88 via conduit 52. As discussed in greater detail below, stack assembly 94 may include a particular arrangement of marine seismic sources 82a-82h. Support structure 30 may be a support structure for stack assembly 94, gas reservoir 88 and conduit 52. In this embodiment, stack assembly 94 may be disposed below a surface of support structure 30 whereas gas reservoir 88 may be disposed above the surface of support structure 30.

In this particular non-limiting embodiment, conduit 52 may include three pipe segments 62, 64, and 66 each with a diameter of about six inches. In other embodiments, pipe segments 62, 64, and 66 may each have a larger or smaller diameter. In the embodiment shown, pipe segment 64 may include a pipe connector 64a connecting two portions of pipe segment 64. Conduit 52 may additionally include elbows 65a and 65b. In this particular embodiment, pipe segment 62 may be disposed in a vertical orientation above stack assembly 94, elbow 65a may connect pipe segment 62 with pipe segment 64 which may be disposed in a horizontal orientation. Elbow 65b may connect pipe segment 64 with pipe segment 66 which may also be disposed in a vertical orientation. Pipe segment 66 may be connected to gas reservoir 88 via aperture 40.

In this embodiment, conduit 52 may include manifold conduits 54a, 54b, 54c, and 54d. Each of manifold conduits 54a, 54b, 54c, and 54d may be connected to each of manifolds 96a, 96b, 96c, and 96d (shown in FIGS. 5A-5B) of stack assembly 94, respectively.

Figure 5A:
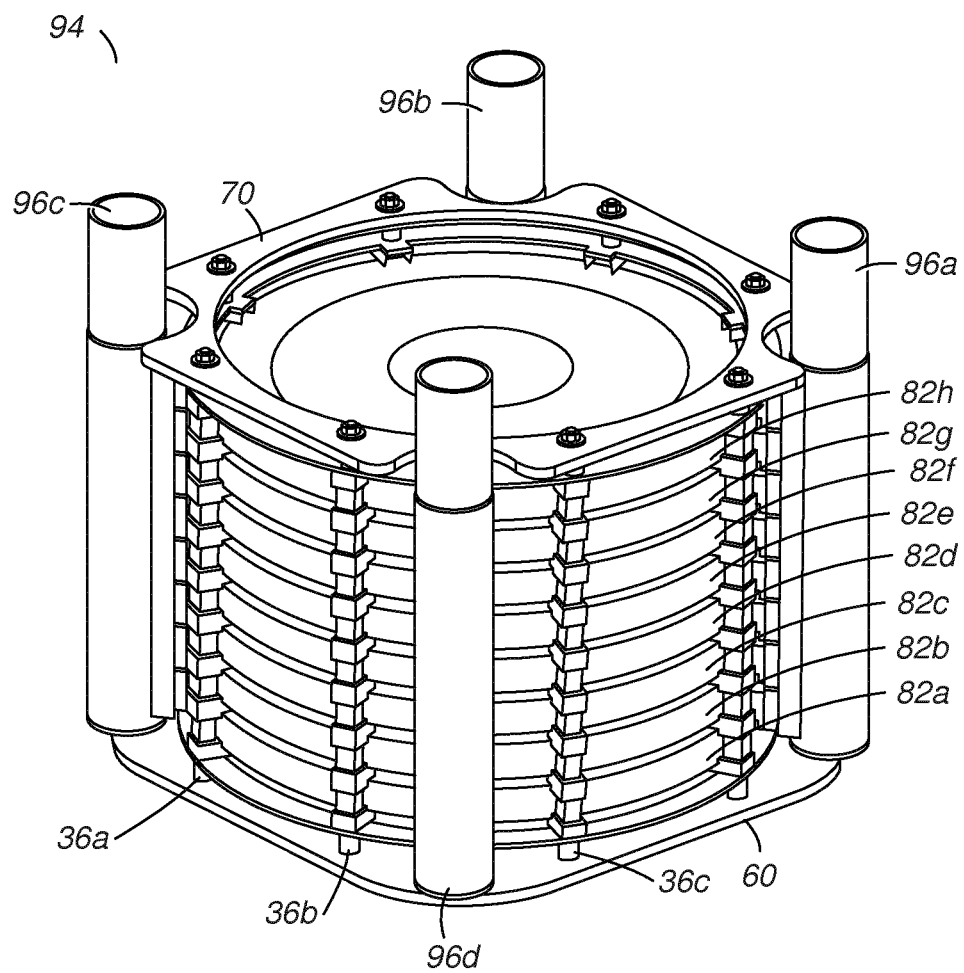
FIG. 5A illustrates a partial assembly of an embodiment of an apparatus according to the disclosure herein.

FIG. 5A illustrates a partial assembly of an embodiment in which an array of marine seismic sources 82a-82h may be arranged in stack assembly 94. In one embodiment, stack assembly 94 may include marine seismic sources 82a-82h in a series configuration. Stack assembly 94 may include four manifolds 96a, 96b, 96c, and 96d. Manifold 96a may include a hose, a pipe, or another similar component. In one particular embodiment, each of manifolds 96a-96d may be a pipe or hose segment with a about three inch diameter, although other diameters are possible and contemplated. Each of manifolds 96a, 96b, 96c, and 96d may be connected to each of ports 92a, 92b, 92c, and 92d of marine seismic source 82a. Each of manifolds 96a, 96b, 96c, and 96d may be connected to each of marine seismic sources 82a-82h.

Figure 5B:
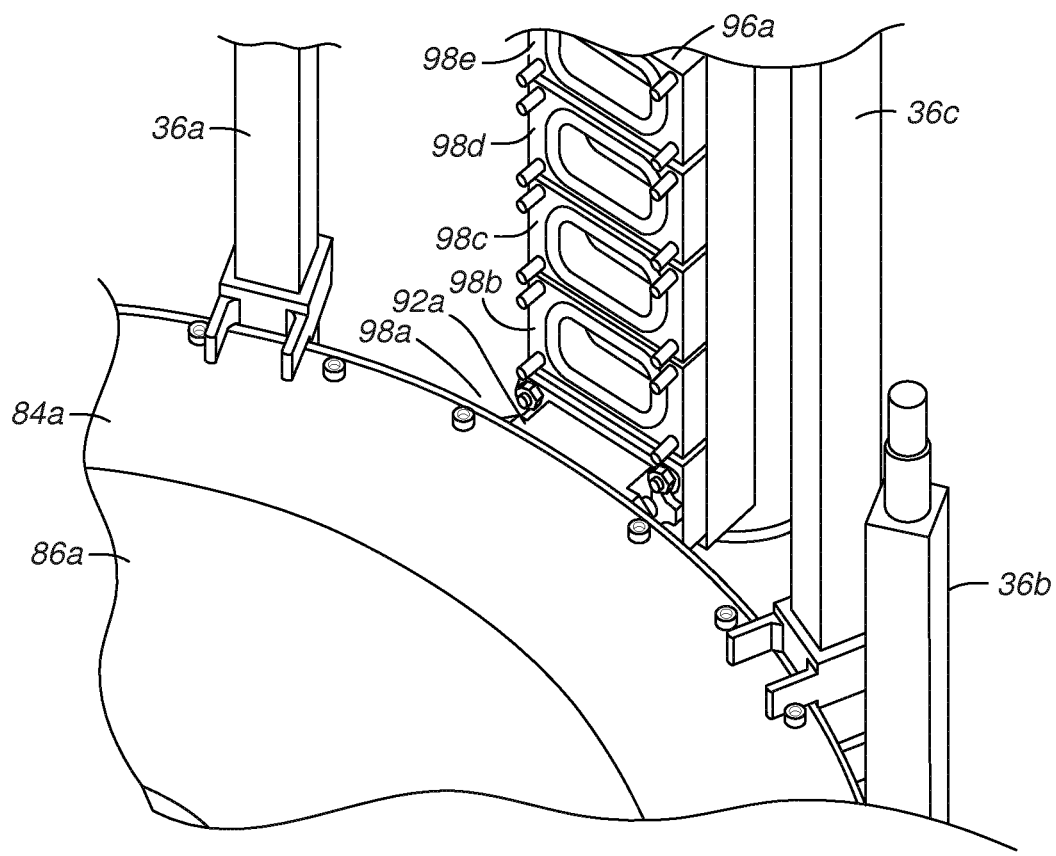
FIG. 5B illustrates a close-up view of the partial assembly shown in FIG. 5A.

FIG. 5B illustrates a close-up view of manifold 96a which may include, in one embodiment, eight port connectors (of which five port connectors 98a-98e corresponding to marine seismic sources 82a-82e are shown). FIG. 5B illustrates a partial assembly of an embodiment in which stack assembly 94 may include support structures such as 36a, 36b and 36c which may hold marine seismic sources 82a-82h in place within stack assembly 94.

The embodiment illustrated in FIG. 5A also shows that stack assembly 94 may include bottom plate 60 and top plate 70 to which marine seismic source 82a may be secured. Marine seismic source 82b may be disposed on top of marine seismic source 82a and marine seismic source 82c may be disposed on top of marine seismic source 82b, and so forth to form a stack configuration of marine seismic sources 82a-82h. Marine seismic sources 82a-82h may be disposed such that they are aligned within stack assembly 94. The stack configuration of marine seismic source 82a-82h may be fastened to bottom plate 60 and/or top plate 70.

Figure 6:
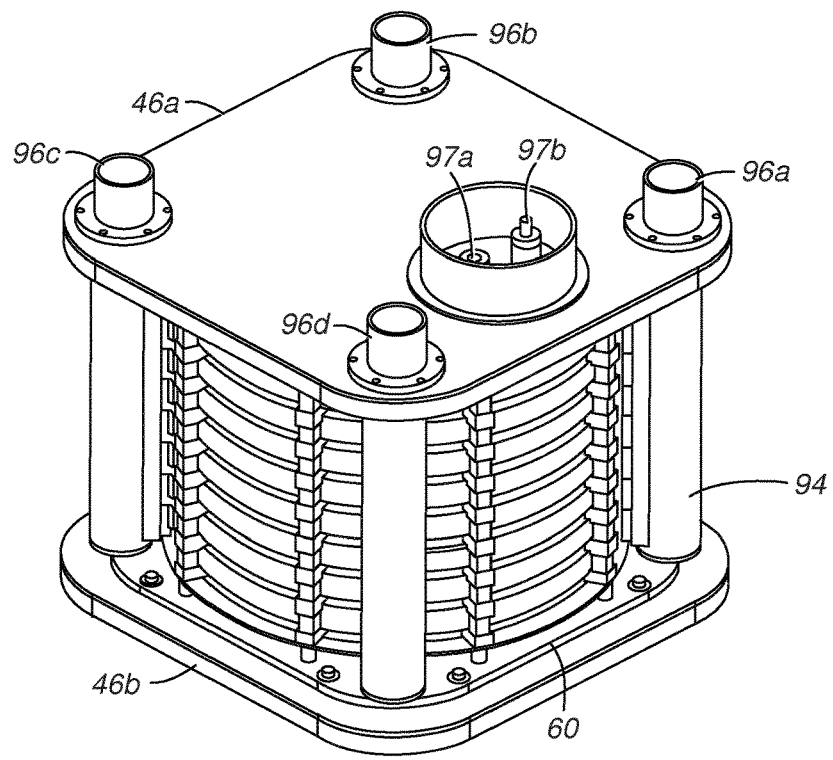
FIG. 6 illustrates an alternative partial assembly that includes components additional to the partial assembly illustrated in FIG. 5A according to the disclosure herein.

FIG. 6 illustrates another partial assembly of an embodiment of stack assembly 94 in which stack assembly 94 may include endplates 46a and 46b. Endplates 46a and 46b may enclose marine seismic source 82a-82h with top plate 70 (not in view) and bottom plate 60. Stack assembly 94 may also include electric connections 97a and 97b which may facilitate electric energy input to piezoelectric components 86a and 86b and/or discs 84a and 84b within stack assembly 94.

Figure 7:
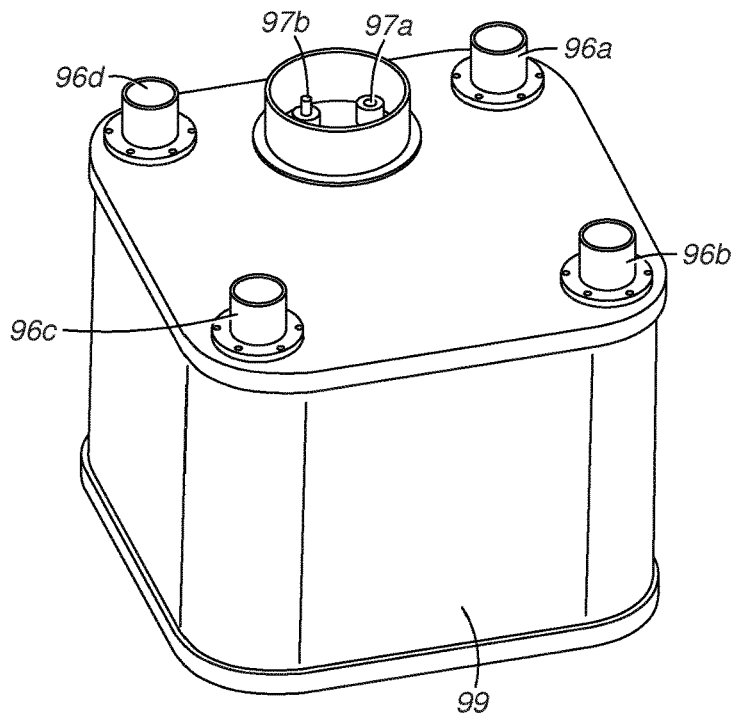
FIG. 7 illustrates yet another alternative partial assembly that includes components additional to the alternative partial assembly illustrated in FIG. 6 according to the disclosure herein.

FIG. 7 illustrates an embodiment of stack assembly 94 in which stack assembly 94 additionally includes boot assembly 99. Boot assembly 99 may enclose and/or be disposed around marine seismic sources 82a-82h and manifolds 96a-96d. In one particular embodiment, boot assembly 99 may include (for example, contain) an electrically insulating material such as a fluid (e.g., electrically insulating oil) in which marine seismic sources 82a-82h may be immersed or at least partially disposed (not in view). The electrically insulating material may serve as an additional protective layer for marine seismic sources 82a-82h during certain operating conditions.

Figure 8:
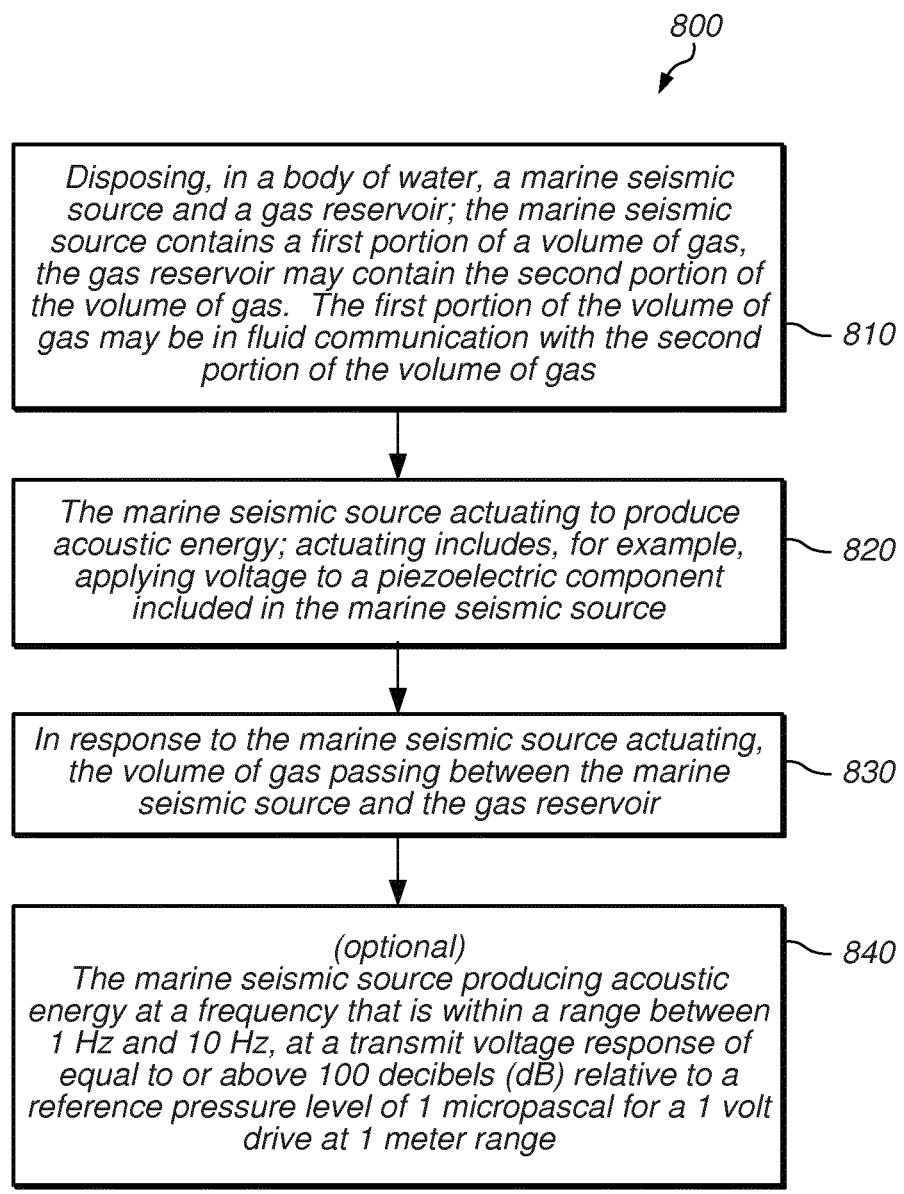
FIG. 8 illustrates a method of operating an apparatus according to an embodiment of the disclosure herein.

FIG. 8 is a flow diagram illustrating an embodiment of a method of operating apparatus 80. The method begins at block 810 for disposing a marine seismic source and a gas reservoir in a body of water. In one example, the marine seismic source and gas reservoir may be towed underwater at a particular depth. The marine seismic source may contain a first portion of a volume of gas. The gas reservoir may contain a second portion of the volume of gas. The volume of gas may be pressurized at a pressure at or near an ambient hydrostatic pressure of the water at the particular depth in which the marine seismic source may be operated.

An advantageous operating depth may be determined based on a frequency of operating apparatus 80. The operating depth may be calculated by $\lambda/4$ where $\lambda$ is a wavelength of the acoustic wave output. In one embodiment in which apparatus 80 is operating at a frequency of 5 Hz, the wavelength may be approximately 300 meters (e.g., based on a sound velocity in water of approximately 1,500 m/s) and the advantageous operating depth may therefore be determined to be approximately 75 meters. When the marine seismic source is being towed at a particular water depth of 75 meters or deeper below water surface, the volume of gas may be pressurized to a pressure at or near an ambient hydrostatic pressure of the water at that particular depth or correspondingly higher.

Apparatus 80 may accordingly contain a total volume of gas that includes a first portion of the volume of gas within the marine seismic source and a second portion of the volume of gas within the gas reservoir. The first portion of the volume of gas may be in fluid communication with the second portion of the volume of gas (e.g., by way of a conduit connecting the marine seismic source and the gas reservoir). Operation proceeds to block 820.

At block 820, the marine seismic source actuating to produce acoustic energy. In one example, actuating the marine seismic source includes applying voltage to the marine seismic source. More specifically, actuating the marine seismic source includes applying voltage to an electromechanical device included in the marine seismic source. In this example, when the electromechanical device includes a piezoelectric component, applying electric energy by the piezoelectric component may cause the marine seismic source to actuate (e.g., bend or flex) and produce acoustic energy. Operation proceeds to block 830.

At block 830, as marine seismic source is actuating, at least a portion of the volume of gas is passing between the marine seismic source and the gas reservoir. At least a portion of the total volume of gas within the marine seismic source resonates as the marine seismic source is actuating. Operation proceeds to block 840.

At optional block 840, the marine seismic source is producing acoustic energy at a frequency within a range between 1 Hz and 10 Hz, and the marine seismic source is operating at a TVR of equal to or above 100 decibels (dB) relative to a reference pressure of 1 micropascal for a 1 volt drive at 1 meter range. In one particular embodiment, the marine seismic source is producing acoustic energy at a frequency of 3 Hz, and the marine seismic source is operating at a TVR of equal to or above 100 decibels (dB) relative to a reference pressure of 1 micropascal for a 1 volt drive at 1 meter range. Operation ends at block 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. An apparatus, comprising:
a marine seismic source that includes
a structural member that defines a perimeter, a first side, and a second side opposite the first side;
a port defined through the perimeter of the structural member;
a first disc coupled on the first side of the structural member;
a second disc coupled on the second side of the structural member;
a cavity defined within the structural member between the first and second discs, the cavity contains a volume of gas;
an electromechanical device configured to selectively deflect the first disc in response to an input of electrical energy at a frequency; and
a conduit that defines a first end and a second end, the conduit coupled to the port on the first end;
a gas reservoir disposed external to the cavity, the gas reservoir coupled to the second end of the conduit;
wherein the conduit is configured to flow at least a portion of the volume of gas within the cavity back and forth between the cavity and the gas reservoir responsive to deflection of the first disc.

2. The apparatus of claim 1, wherein the frequency of the electrical energy is a resonant frequency of the cavity and conduit combination.

3. The apparatus of claim 1, wherein the electromechanical device is configured to deflect the second disc in response to the input of electric energy.

4. The apparatus of claim 1, wherein the electromechanical device includes a piezoelectric component.

5. The apparatus of claim 1, further comprising a plurality of conduits arranged in an array, the plurality of conduits fluidly couple the cavity to the gas reservoir.

6. The apparatus of claim 1, wherein the discs are configured to create a sound pressure level of 200 decibels (dB) relative to a reference pressure of 1 micropascal, and wherein the frequency between and including 1 Hz to 10 Hz.

7. The apparatus of claim 1, wherein the frequency is 3 Hz.

8. The apparatus of claim 1, wherein the structural member further comprises a hoop configured to maintain a separation between a pair of piezoelectric components.

9. A system, comprising:
a vessel;
a marine seismic source towable behind the vessel, wherein the marine seismic source includes
a structural member that defines a perimeter, a first side, and a second side opposite the first side;
a port defined through the perimeter of the structural member;
a first disc coupled on the first side of the structural member;
a second disc coupled on the second side of the structural member;
a cavity defined within the structural member between the first and second discs, the cavity contains a volume of gas;
an electromechanical device configured to selectively deflect the first disc in response to an input of electrical energy at a frequency; and
a conduit coupled to the port on a first end of the conduit;
an external gas reservoir fluidly coupled to the cavity of the marine seismic source by way of a second send of the conduit;
wherein the conduit is configured to provide continuous, two-way fluid communication between the cavity and the external gas reservoir.

10. The system of claim 9, wherein the electromechanical device of the marine seismic source includes a piezoelectric component.

11. The system of claim 9, further comprising:
a plurality of marine seismic sources, wherein the plurality of marine seismic sources are arranged in a stack assembly.

12. The system of claim 9, wherein the marine seismic source includes an electrically insulating fluid disposed at least partially around the marine seismic source.

13. The system of claim 9, wherein the cavity includes a volume of gas at a pressure greater than a static pressure at a particular water depth.

14. A method, comprising:
disposing a marine seismic source in a body of water, the marine seismic source defines a cavity;
disposing a gas reservoir with the marine seismic source in the body of water, the gas reservoir disposed external to the cavity;
wherein the cavity of the marine seismic source contains a first portion of a volume of gas, the first portion of the volume of gas in fluid communication with a second portion of the volume of gas, the second portion of the volume of gas contained in the gas reservoir;
actuating the marine seismic source;
in response to the marine seismic source actuating, a portion of the volume of gas passing from the marine seismic source and to the gas reservoir.

15. The method of claim 14, wherein actuating the marine seismic source includes applying voltage to a piezoelectric component.

16. The method of claim 14, further comprising:
towing the marine seismic source in the body of water at a depth of 75 meters or deeper.

17. The method of claim 14, further comprising:
the marine seismic source producing acoustic energy at a frequency that is within a range between 1 Hz and 10 Hz, at a transmit voltage response of equal to or above 100 decibels (dB) relative to a reference pressure level of 1 micropascal for a 1 volt drive at 1 meter range.

18. The method of claim 17, wherein the marine seismic source produces acoustic energy at a frequency of 3 Hz.

* * * * *